(12) United States Patent
Park

(10) Patent No.: US 6,301,963 B1
(45) Date of Patent: Oct. 16, 2001

(54) MICROGYROSCOPE HAVING INNER AND OUTER MASS PARTS

(75) Inventor: Kyu-Yeon Park, Yongin-si (KR)

(73) Assignee: Samsung Electro-Mechanics Co., Ltd, Kyungki-Do (KR)

( * ) Notice: Subject to any disclaimer, the term of this patent is extended or adjusted under 35 U.S.C. 154(b) by 0 days.

(21) Appl. No.: 09/475,618

(22) Filed: Dec. 30, 1999

(30) Foreign Application Priority Data

May 13, 1999 (KR) .................................................. 99-17194
Oct. 29, 1999 (KR) .................................................. 99-47403

(51) Int. Cl.$^7$ ...................................................... G01P 9/00
(52) U.S. Cl. ...................................... 73/504.12; 73/504.02
(58) Field of Search ............................ 73/504.04, 504.12, 73/504.13, 504.14, 504.15, 504.16, 504.02

(56) References Cited

U.S. PATENT DOCUMENTS

| 5,728,936 | * | 3/1998 | Lutz ................................. | 73/504.14 |
| 5,747,690 | | 5/1998 | Park et al. ........................ | 73/504.12 |
| 6,067,858 | * | 5/2000 | Clark et al. ...................... | 73/504.16 |
| 6,089,088 | * | 7/2000 | Charvet ............................ | 73/504.12 |
| 6,089,089 | * | 7/2000 | Hsu ................................... | 73/504.12 |
| 6,122,961 | * | 9/2000 | Geen et al. ....................... | 73/504.12 |
| 6,134,961 | * | 10/2000 | Touge et al. ..................... | 73/504.12 |

* cited by examiner

Primary Examiner—Helen Kwok
(74) Attorney, Agent, or Firm—Lowe Hauptman Gilman & Berner, LLP

(57) ABSTRACT

A microgyroscope is disclosed, in which an oscillating mass is oscillated by dividing it into three parts, and thus, the forces transmitted from external oscillations are minimized, thereby minimizing the influence of the external oscillations. The microgyroscope includes an inner mass part 110 excitedly installed within an outer frame 120 across beam elastic bodies 130. A plurality of combs 150 are formed on the inner mass part 110, the combs 150 extending in the y axis direction. A plurality of sensing electrodes 170 are disposed between the plurality of the combs 150, the sensing electrode being formed integrally with an electrode supporting part 160. The inner mass part 110 is connected through elastic bodies to outer mass parts 210 and 210'. In this manner, the influence of external oscillations can be minimized, and the friction loss of the supporting part can also be minimized, thereby improving the resolving power of the microgyroscope.

8 Claims, 4 Drawing Sheets

MICROGYROSCOPE HAVING INNER AND OUTER MASS PARTS

FIELD OF THE INVENTION

The present invention relates to a microgyroscope in which an oscillating mass is oscillated by dividing it into three parts, and the three oppositely oscillating mass parts are made to be equal to each other, so that the forces transmitted from external oscillations are minimized, thereby minimizing the influence of the external oscillations.

BACKGROUND OF THE INVENTION

Generally, the angular velocity sensing devices for detecting the angular velocities of inertial bodies have been widely employed as a component of navigation apparatus in the ocean vessels, air planes and the like. At the present, this device has been extended to the navigation apparatus of automobiles, and to the high performance video camera as a hand-oscillation compensating device.

The conventional gyroscope which has been used for the military purposes and for air planes is manufactured by using a plurality of high precision components and through a complicated assembling process, and therefore, a precise performance is possible. However, its manufacturing cost is high, and its bulk is very large, with the result that it cannot be used for the general industries, and for the home power appliances.

Recently, a small gyroscope has been developed by attaching a piezoelectric device to a triangular prism beam, and this is used as a hand-oscillation sensor for a small video camera. Further, in order to overcome the difficulties of the gyroscope having the piezoelectric device, a small gyroscope with an improved cylindrical beam structure has been developed.

However, these two kinds of the small gyroscopes require precisely machined components, and therefore, the manufacture becomes difficult, while the manufacturing cost becomes high. Further, the mentioned two kinds of gyroscope includes a plurality of mechanical components, and therefore, it is difficult to form a circuit integration.

The principle of the gyroscope is as follows. That is, when a rotating inertial body which rotates or oscillates in a first axis direction receives an input of an angular velocity in a second axis direction (which is perpendicular to the first axis direction), the gyroscope detects a Coriolis force which acts in a third axis direction (which is rectangular to the first and second axes direction).

Under this condition, if the forces acting on the inertial body are made to be balanced, then the detection of the angular velocity has to be more precise. Particularly, if the linearity and the band width are to be expanded, a force balancing structure is required.

A conventional microgyroscope related to this technique is illustrated in U.S. Pat. No. 5,747,690, and it is as shown in FIG. 1.

As shown in FIG. 1, an excitation is made to occur in the horizontal direction by utilizing combs 41, and in the same manner, the Coriolis oscillations of a floating mass 50 induced in the perpendicular direction (y axis) can be sensed by sensing electrodes 38.

Under this condition, in the case where an ac voltage is supplied to combs 39, 40, 41 and 42 of both sides of the floating mass 50 so as to make the floating mass 50 oscillate in the direction of the x axis, if an angular velocity is inputted in the direction of the z axis, then the mass is oscillated in the direction of the y axis with the same frequency by the Coriolis force. Under this condition, the oscillation range in the direction of the y axis can be detected based on the relevant oscillation frequency by utilizing the sensing electrodes 38 proportionally to the supplied angular velocity, thereby obtaining the angular velocity signals.

However, in the above described case, the mass oscillates to one side, and therefore, the oscillations are excessively transmitted to the supporting part. As a result, a mechanical loss is resulted, and the exciting oscillation width is affected by the external oscillations.

Further, in the above described microgyroscope, by the strong transmission of the oscillations to the supporting part 31, a negative influence is received to the rise of the sensitivity of the gyroscope, and the linearity is aggravated due to the magnitude of the angular velocity. Consequently, the resolving power of the gyroscope is lowered, and the life expectancy of the gyroscope is shortened.

SUMMARY OF THE INVENTION

The present invention is intended to overcome the above described disadvantages of the conventional techniques.

Therefore it is an object of the present invention to provide a microgyroscope in which an oscillating mass is oscillated by dividing it into three parts, and the three oppositely oscillating mass parts are made to be equal to each other, so that the forces transmitted from external oscillations are minimized, that the influence of the external oscillations is minimized, and that the friction loss of the supporting parts is minimized, thereby improving the resolving power of the gyroscope, and extending the life expectancy of the gyroscope.

In achieving the above object, the microgyroscope according to the present invention includes: an inner frame as an inner mass part excitedly installed within an outer frame to be unitizingly excited together; a first plurality of combs installed laterally and in a y axis direction at both sides of the inner frame and within the inner frame; perpendicular direction sensing electrodes disposed between the first plurality of the combs at certain intervals, and supported by electrode supporting parts; outer mass parts installed at both sides of the inner mass part; elastic bodies excitedly installed between the outer frame and the outer mass parts; oscillation structures extending in a lateral direction of the outer mass parts; a second plurality of combs installed at a side of each of the oscillation structures; exciting drivers for causing excitations by supplying a voltage; and a third plurality of combs disposed respectively between the second plurality of the combs of the oscillation structures, for detecting the excitations from a difference of capacitances between the exciting drivers.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 1:
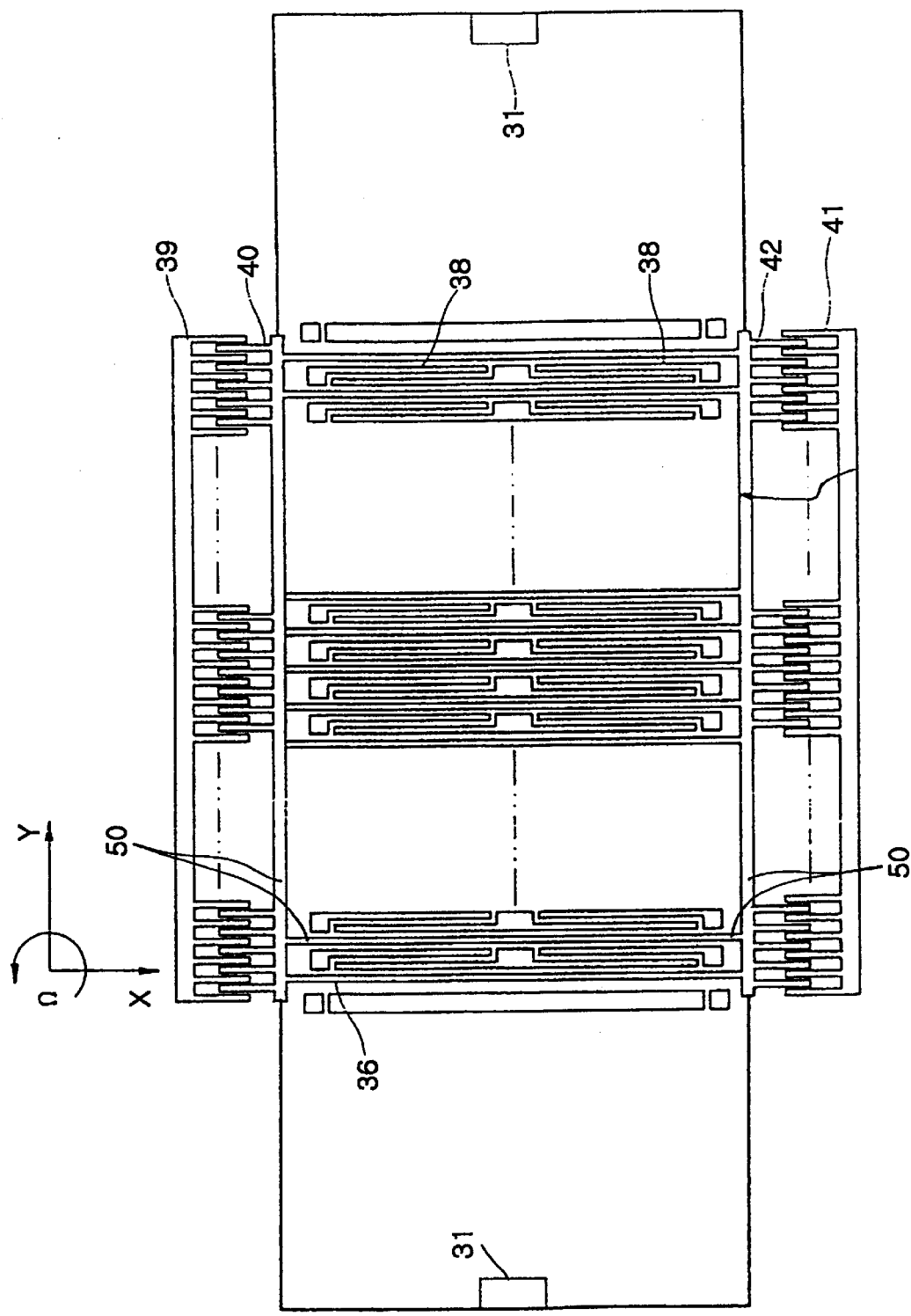
FIG. 1 is a plan view of a conventional microgyroscope.
Figure 2:
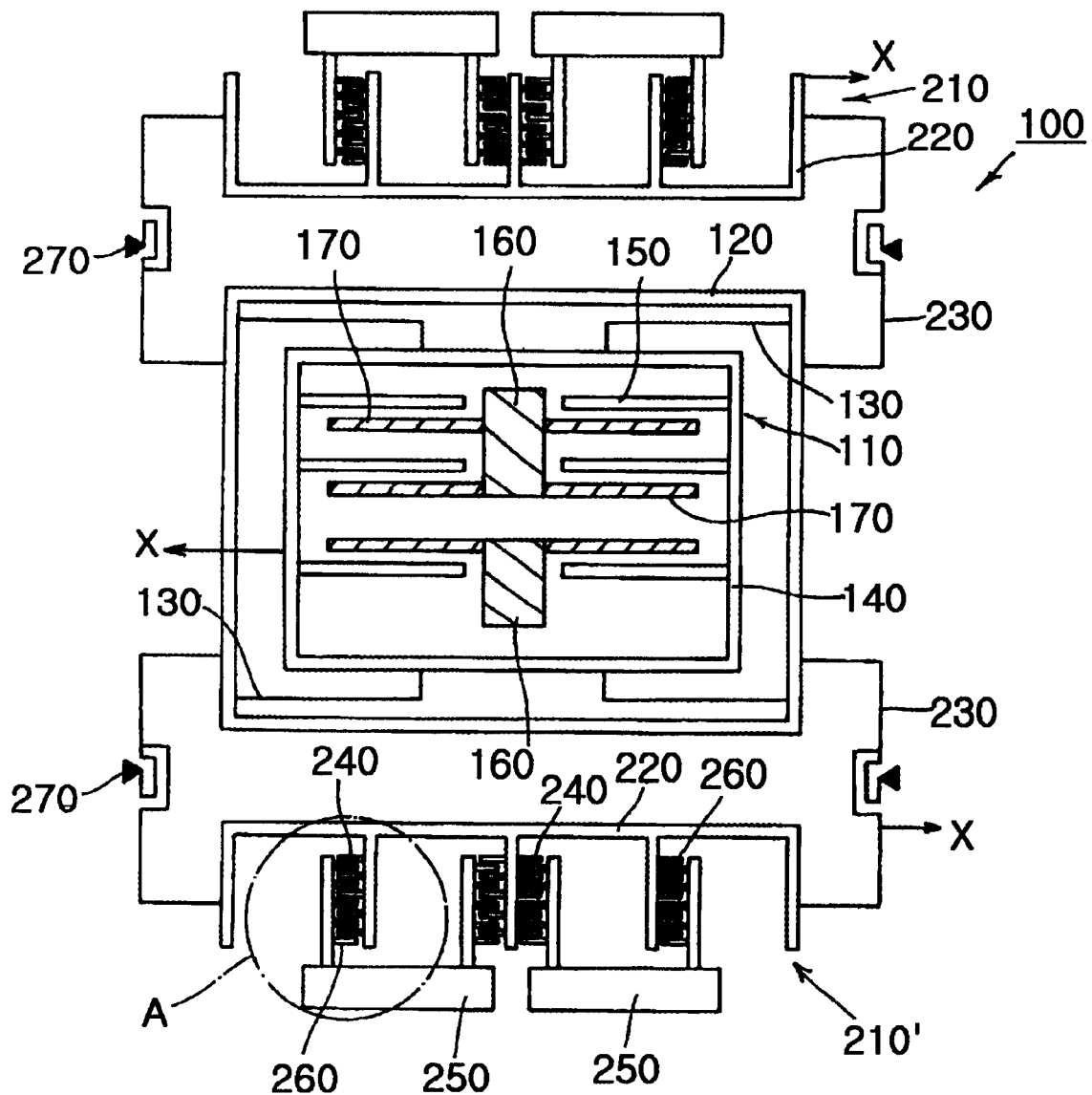
FIG. 2 is a plan view showing the constitution of the microgyroscope according to the present invention.
Figure 3:
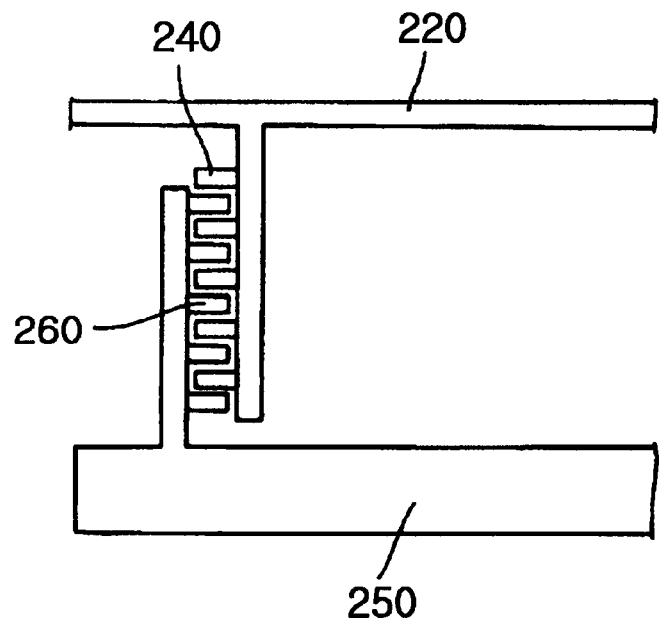
FIG. 3 illustrates the portion A of FIG. 2.

FIG. 2 is a plan view showing the constitution of the microgyroscope according to the present invention. FIG. 3 illustrates the portion A of FIG. 2.

The oscillation structure of the gyroscope device 100 according to the present invention includes: an inner mass part 110 having a Coriolis sensing part; and exciting mass parts 210 and 210' installed at both sides of an outer frame 120.

The inner mass part 110 includes: an inner frame 140 for being unitizingly excited together with the outer frame 120, with elastic bodies 130 being installed within the outer frame 120 at four places of front and rear and left and right of the outer frame 120; a plurality of combs 150 installed at both sides of and within the inner frame 140 laterally and in a y axis direction; and a plurality of sensing electrodes 170 disposed between the plurality of the combs 150 in the y axis direction, the sensing electrodes 170 being supported by an electrode supporting part 160.

If the inner frame 140 is excited by the electrostatic forces generated between the sensing electrodes 170 of the electrode supporting part 160 and the combs 150 of the inner frame 140 during the supply of a voltage through the electrode supporting part 160, then the beam elastic bodies 130 which are installed between the outer and inner frames 120 and 140 make the outer frame 120 excited in the vertical direction in a unitizing manner. Under this condition, the excitation state can be detected based on a difference of capacitances formed between the combs 150 of the inner frame 140 and the sensing electrodes 170 of the supporting part 160. Further, the movement of the outer frame 120 in the y axis direction by the Coriolis force is inhibited.

Further, the outer mass parts 210 and 210' which are installed at both sides of inner mass part 110 respectively include oscillation structures 220, and respectively are connected to a plurality of combs 240. Each of the oscillation structures 220 is excited through the elastic bodies 230 and the outer frame 120.

The plurality of the combs 240 of the oscillation structure 220 are disposed with gaps between another plurality of combs 260 which are connected to exciting drivers 250 which are in turn excited by a supplied voltage. The oscillation structure is excited by the electrostatic forces which are formed between the combs 240 of the oscillation structure 220 and the combs 260 of the exciting drivers 250. The excitation state can be detected based on a difference of capacitances formed between the combs 240 of the oscillation structure 220 and the combs 260 of the exciting drivers 250.

Under this condition, the exciting driver 250 which is for oscillating the oscillation structure 220 in the lateral and horizontal direction (x axis) is disposed in parallel to the lengthwise direction of the oscillation structure 220. The plurality of combs 260 which are integrally connected to the exciting driver 250 are disposed between the combs 240 of the oscillation structure 220.

Figure 4:
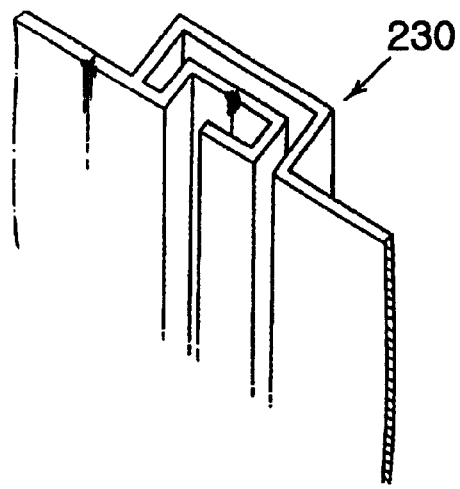
FIG. 4 illustrates the elastic bodies installed at four corners of the inner mass part of the gyroscope, for connecting the outer mass parts according to the present invention.
Figure 5:
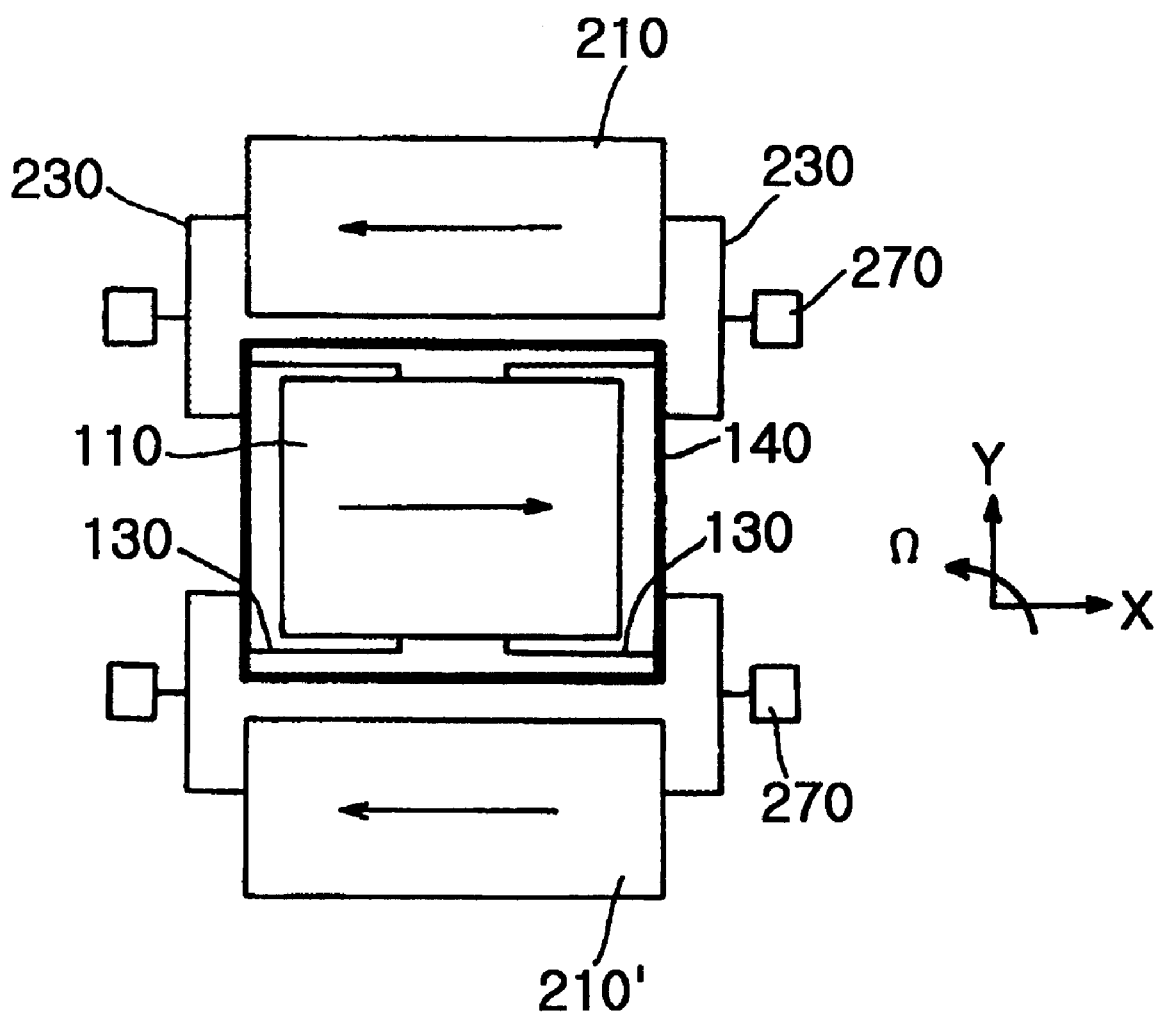
FIG. 5 schematically illustrates the oscillation state of the gyroscope according to the present invention.

Meanwhile, FIG. 4 illustrates the elastic bodies installed at both sides of the inner mass part of the gyroscope, for connecting the outer mass parts according to the present invention. FIG. 5 schematically illustrates the oscillation state of the gyroscope according to the present invention.

As shown in these drawings, each of the elastic bodies 230 which are flat elastic bodies is supported by each of elastic body supporting part 270. The outer mass parts 210 and 210' and the inner mass part 110 are moved oppositely in the horizontal direction (x axis) through the elastic bodies 230 upon supplying a voltage from the exciting drivers 250 of the outer mass parts 210 and 210'. Under this condition, when an angular velocity is inputted from the outside, the inner mass part 110 oscillates in the x axis direction with a magnitude proportional to the inputted angular velocity.

Accordingly, when the outer mass parts 210 and 210' and the inner mass part 110 oscillate, they are oscillated in the opposite directions. Under this condition, the active masses are equal to each other.

Now the present invention will be described as to its operation.

As shown in FIG. 5, the inner mass part 110 as an oscillation structure having a mass M, and the outer mass parts 210 and 210' having a mass of M/2 and serving as oscillation structures, are supported by the elastic exciting bodies 230 in the x axis direction and by the beam elastic bodies 130 in the y axis direction. In the above described oscillation system, an external force which excites the oscillation structures in the direction of the x axis can be expressed by the following formula:

$$f = F\sin(\omega t)$$

Meanwhile, the dislocation x and the velocity V in the direction of the x axis can be expressed by the following formulas:

$$x = \frac{FQx}{kx}\cos(\omega t)$$

$$Vx = \frac{FQx\omega}{kx}\sin(\omega t)$$

where x is the dislocation in the direction of the x axis, and Vx is the velocity of the oscillation structure in the direction of the x axis.

The dislocation in the direction of the y axis owing to the Coriolis force which is proportional to the inputted angular velocity is calculated based on the following formula:

$$y = \frac{2fQxQy}{\omega k}\Omega\sin(\omega t)$$

where Qx and Qy are constants applicable to the directions of the x axis and the y axis, and Q is the inputted angular velocity.

Therefore, if the y dislocation is detected, then the angular velocity of the inertial body can be measured.

In the gyroscope device 100 of the present invention, the mass M corresponds to the mass M and M/2 of the oscillation structures. Thus if an ac voltage which corresponds to the natural oscillation frequency of the exciting drivers 250 and 250' is supplied, then oscillations occur in the direction of the x axis owing to the electrostatic forces between the combs.

Such forces of the exciting drivers 250 can be expressed by the following formula:

$$f_x = \frac{\epsilon t n_x V^2}{h}$$

where f is the driving force, $\epsilon$ is the dielectric constant of air, t is the thickness of the comb, $n_x$ is the number of the pairs of the combs, V is the driving voltage, and h is the distance between the combs.

The oscillation structure which receives the defined driving force oscillates in accordance with the natural oscillation frequency. In order to maintain this natural oscillation frequency, a voltage which satisfies the unstable oscillation control conditions is generated based on the detected movements, thereby activating the exciting drivers 250 and 250'.

If an angular velocity is inputted to the oscillating structure, the oscillation structure makes oscillating movements in the direction of the x axis, and at the same time, makes a dislocation in the direction of the y axis. This dislocation causes a variation in the capacitance formed between the sensing electrodes 170 and the combs 150 of the frame 140 which is the oscillation structure.

As shown in FIG. 2, the sensing electrodes 170 consist of anodes and cathodes. The variations of the capacitances of the anodes are opposite to the variations of the capacitances of the cathodes, and therefore, if the differences between the capacitances of the anodes and the cathodes are calculated, then the dislocation of the oscillation structure in the direction of the y axis can be measured.

The difference ΔC of the capacitances between the anodes and the cathodes is calculated based on the following formula:

$$\Delta C = \frac{2\epsilon l_s t n_s}{h_s^2} y$$

where $n_s$ is the number of the pairs of the sensing electrodes 170, $\epsilon$ is the dielectric constant of air, is is the length of the sensing electrode, t is the thickness between the combs 150 of the inner frame 110 (as the oscillation structure) and the sensing electrodes 170 of the electrode supporting parts 140 and 160, and $h_s$ is the gap between the sensing electrode and the oscillation structure.

If there is used the general circuit for detecting the variations of the capacitances, then the voltage signals which are proportional to the variations of the capacitances can be detected, and consequently, the signals of the angular velocity can be detected.

Meanwhile, as a common factor which decides the performance of the gyroscope, the dislocation in the direction of the y axis by the Coriolis force has to be maximized, and for this purpose, the natural oscillation frequencies of the x axis and the y axis need to be made to correspond to each other.

In the present invention, the stiffness is influenced in the direction of the y axis by the electrostatic forces of the sensing electrodes 170, and therefore, by utilizing these electrostatic forces, the natural oscillation frequency can be adjusted. The natural oscillation frequency in the direction of the y axis can be expressed by the following formula:

$$fn = \frac{1}{2\pi} \sqrt{\frac{k_b - k_n}{m}}$$

where $k_b$ is the constant of the elastic body, and $k_n$ is the constant of the elastic body, which is generated by the electrostatic forces between the sensing electrodes and the combs as the oscillation structure.

The constant kn can be expressed by the following formula:

$$k_n = \frac{2\epsilon l_s t n_s}{h_s^3} V_b^2$$

where $V_b$ is the bias voltage supplied to the sensing electrodes.

By adjusting the bias voltage, the natural oscillation frequency of the y axis can be made to correspond to the natural oscillation frequency of the x axis.

In this context, if the bias voltage of the sensing electrodes is varied in the above described method, then the output of the gyroscope is varied. Therefore, the bias voltage of the sensing electrodes is fixed by using one of other methods, and then, an exact adjustment can be carried out by using a separate natural oscillation frequency adjusting electrode.

According to the present invention as described above, an oscillating mass is oscillated by dividing it into three parts, and the three oppositely oscillating mass parts are made to be equal to each other, so that the forces transmitted from external oscillations are minimized, that the influence of the external oscillations is minimized, and that the friction loss of the supporting parts is minimized, thereby improving the resolving power of the gyroscope, and extending the life expectancy of the gyroscope.

In the above, the present invention was described based on the specific preferred embodiments and the attached drawings, but it should be apparent to those ordinarily skilled in the art that various changes and modifications can be added without departing from the spirit and scope of the present invention, which are defined in the appended claims.

What is claimed is:

1. A microgyroscope comprising:
    an inner frame as an inner mass part excitedly installed within an outer frame to be unitizingly excited together;
    a first plurality of combs installed laterally and in a y axis direction at both sides of said inner frame and within said inner frame;
    perpendicular direction sensing electrodes disposed between the first plurality of said combs at certain intervals, and supported by electrode supporting parts;
    outer mass parts installed at both sides of said inner mass part;
    elastic bodies excitedly installed between said outer frame and said outer mass parts;
    oscillation structures extending in a lateral direction of said outer mass parts;
    a second plurality of combs installed at a side of each of said oscillation structures;
    exciting drivers for causing excitations by supplying a voltage; and
    a third plurality of combs disposed respectively between the second plurality of said combs of said oscillation structures, for detecting the excitations from a difference of capacitances between said exciting drivers.

2. The microgyroscope as claimed in claim 1, wherein said inner mass part is installed unitizingly excitedly together with said outer frame through beam elastic bodies, said beam elastic bodies being installed at four places of front, rear, left and right of said inner frame.

3. The microgyroscope as claimed in claim 1, wherein a plurality of y-axis sensing electrodes are disposed with gaps between the first plurality of said combs of said inner frame, the plurality of said sensing electrodes being supported by electrode supporting parts.

4. The microgyroscope as claimed in claim 1, wherein the second plurality of said combs of said oscillation structures are disposed with gaps between the third plurality of said combs of said exciting drivers, said drivers being excited by a supplied voltage.

5. The microgyroscope as claimed in claim 1, further comprising flat spring type elastic bodies for connecting said outer frame to said outer mass parts.

6. The microgyroscope as claimed in claim 1, wherein said elastic bodies are secured by elastic body supporting parts respectively.

7. The microgyroscope as claimed in claim 1, wherein said inner mass part and said outer mass parts move oppositely in a direction of an x axis through said elastic bodies.

8. The microgyroscope as claimed in claim 7, wherein the mass of the inner mass part and the total mass of the outer mass parts are equal.

* * * * *